(12) United States Patent
Palacio et al.

(10) Patent No.: US 7,437,163 B2
(45) Date of Patent: Oct. 14, 2008

(54) METHOD AND COMPUTER-READABLE MEDIUM FOR CONTROLLING OPERATIONS OF A DUAL-DIALER STATE MACHINE

(75) Inventors: Julio Palacio, Alpharetta, GA (US); Duc Dinh Lai, Chantilly, VA (US); Denis Londry, Surrey (CA); Pieter Truter, North Vancouver (CA)

(73) Assignee: Nextel Communications Inc., Reston, VA (US)

( * ) Notice: Subject to any disclaimer, the term of this patent is extended or adjusted under 35 U.S.C. 154(b) by 640 days.

(21) Appl. No.: 11/156,628

(22) Filed: Jun. 21, 2005

(65) Prior Publication Data
US 2006/0286991 A1  Dec. 21, 2006

(51) Int. Cl.
*H04Q 7/20* (2006.01)
(52) U.S. Cl. .................. 455/445; 455/550.1; 455/90.1; 455/521; 370/339; 370/392; 370/395.5

(58) Field of Classification Search ......... 455/517–519, 455/90.1–90.3, 445, 556.1, 557, 512, 509, 455/521, 524, 527, 450, 455, 422.1, 500, 455/550.1; 370/466, 312, 327–329, 334, 370/338–340, 353, 354, 360, 392, 395.3, 370/395.42, 395.5
See application file for complete search history.

(56) References Cited

U.S. PATENT DOCUMENTS

| | | | | |
|---|---|---|---|---|
| 6,067,457 | A * | 5/2000 | Erickson et al. | 455/512 |
| 7,155,255 | B2 * | 12/2006 | Blum et al. | 455/560 |
| 7,174,168 | B2 * | 2/2007 | Klein et al. | 455/445 |
| 2004/0192286 | A1 * | 9/2004 | Longhurst et al. | 455/422.1 |
| 2006/0148503 | A1 * | 7/2006 | Lasisi et al. | 455/518 |
| 2007/0060133 | A1 * | 3/2007 | Spitzer et al. | 455/445 |

* cited by examiner

*Primary Examiner*—Sujatha Sharma

(57) ABSTRACT

A method and computer-readable medium for a dual dialer state machine are provided. The state machine allows a Radio Interface Layer (RIL) to make decisions on whether to allow calls to be initiated or terminated depending upon the type of call (interconnect or dispatch). The RIL uses the state machine to coordinate the functions of an interconnect phone application and a dispatch phone application.

18 Claims, 3 Drawing Sheets

METHOD AND COMPUTER-READABLE MEDIUM FOR CONTROLLING OPERATIONS OF A DUAL-DIALER STATE MACHINE

BACKGROUND OF THE INVENTION

Wireless communications systems typically provide interconnect and/or dispatch voice communication services. Interconnect voice communication services are those typically provided by most wireless carriers as circuit-switched communications. Dispatch communication services are commonly known as walkie-talkie or push-to-talk (PTT) types of calls, such as the Nextel Communications, Inc. service identified by the trade name Direct Connect. Interconnect voice communication services provided by most wireless carriers can be provided between sources and destinations of different wireless carriers.

A device that has telephony features with dispatch functionality requires a state machine to determine what the next valid action is in response to various inputs, either from the user, from the device's operating system (OS) or from a carrier network. Examples of the device include: a mobile phone and a handheld computer with dispatch functionality, such as a personal digital assistant (PDA) or a Pocket PC (PPC) with a mobile phone application program. An operating system is the basic platform that the device runs on. The purpose of an operating system is to organize and control hardware and software so that the device it resides in behaves in a flexible but predictable way. An example of an operating system used for PPCs is Microsoft's Windows Mobile 2003 for Pocket PC (MS 2003 PPC OS). The MS PPC 2003 OS enhances the ability to communicate and to send, receive and manage data while mobile.

Wireless technologies, such as CDMA and GSM devices, include a Radio Interface Layer (RIL) for the MS PPC 2003 OS. The RIL is an interface layer between the OS and an RF module in the PPC. However, the RILs of the CDMA and GSM devices do not incorporate the added functionality of dispatch calling and their state machine is simpler.

SUMMARY OF THE INVENTION

A method and computer-readable medium for a dual dialer state machine are provided. The state machine of the present invention allows the RIL to make decisions on whether to allow calls to be initiated or terminated depending upon the type of call (interconnect or dispatch). The RIL uses the state machine to coordinate the functions of an interconnect phone application program, which has interconnect phone capability, and a dispatch phone application program, which provides dispatch phone capability. For example, the MS PPC 2003 OS includes an interconnect phone application program. An example of a dispatch phone application program is the dispatch "uPhone" application of Nextel Communications, Inc.

Other objects, advantages and novel features of the present invention will become apparent from the following detailed description of the invention when considered in conjunction with the accompanying drawings.

DETAILED DESCRIPTION OF THE EXEMPLARY EMBODIMENTS

The MS PPC 2003 OS described above has a phone dialer for interconnect calls, but it does not have a phone dialer for dispatch calls. Thus, a second phone dialer for dispatch calls is needed to provide for dispatch calling. Furthermore, a state machine is needed to determine which dialer to use under given conditions.

Figure 1:
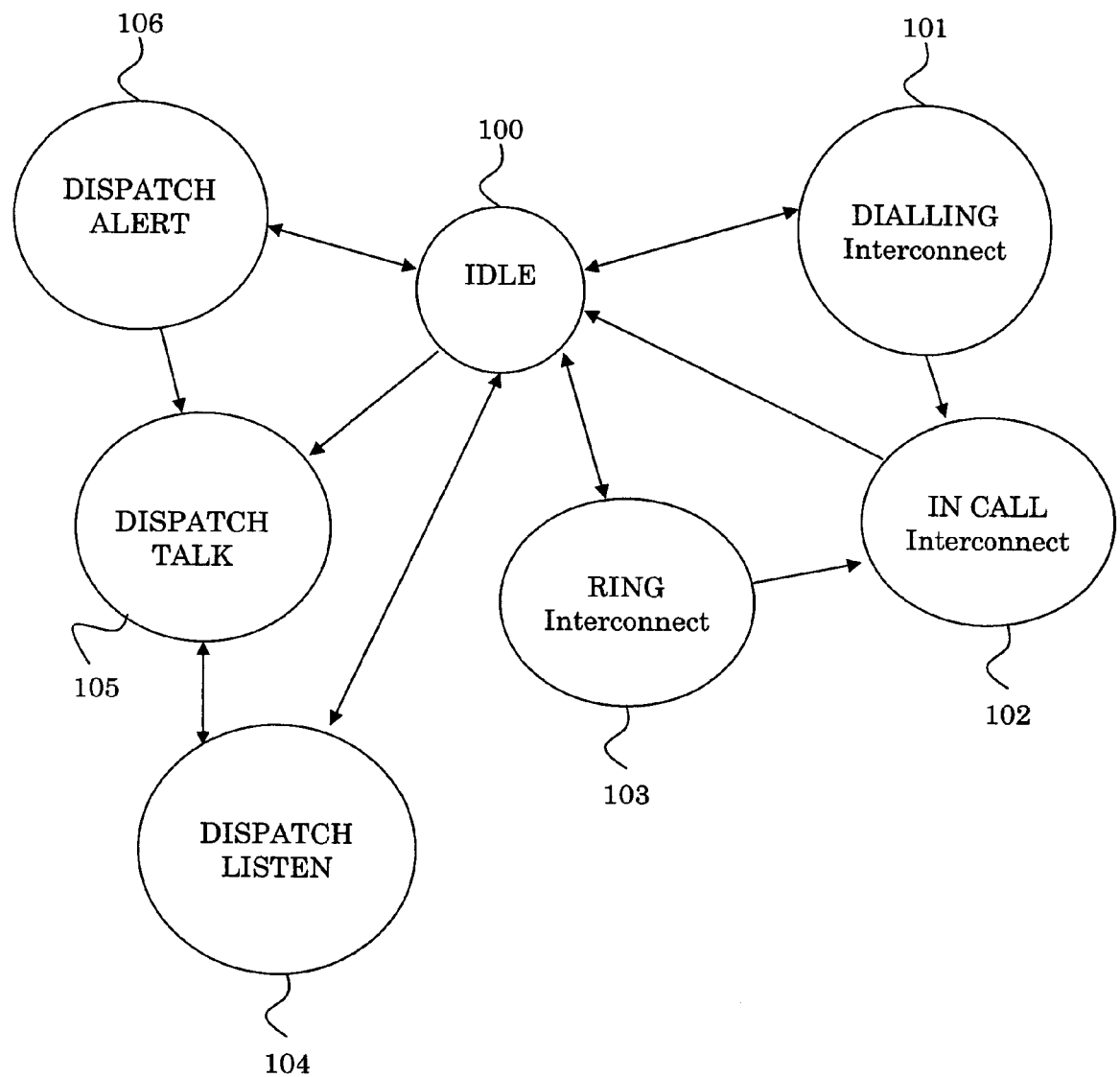
FIG. 1 illustrates an exemplary dual dialer state machine in accordance with the present invention.

FIG. 1 illustrates a dual dialer state machine in accordance with the present invention. The state machine begins in the IDLE state 100. From the IDLE state 100, the state machine can transition into any of the DIALLING state 101, the RING state 103, the DISPATCH LISTEN state 104, the DISPATCH TALK state 105, and the DISPATCH ALERT state 106. When the user begins dialling a telephone number to make an interconnect call, the state machine transitions to the DIALLING state 101. When the interconnect call has been established, the state machine transitions from the DIALLING state 101 to the IN CALL state 102. After the call has been completed, the state machine transitions back to the IDLE state 100.

When the user's phone receives an incoming interconnect call, the state machine transitions from the IDLE state 100 to the RING state 103. When the user answers the incoming call, the state machine transitions from the RING state 103 to the IN CALL state 102. When the call is completed, the state machine transitions from the IN CALL state 102 to the IDLE state 100.

From the IDLE state 100, the state machine may transition into dispatch states 104-106, when a dispatch input is received. When a dispatch alert is sent by the user or received by the user, the state machine transitions to the DISPATCH ALERT state 106. If the user sent the dispatch alert, the state machine transitions from the DISPATCH ALERT state 106 back to the IDLE state 100, after the dispatch alert has been sent. From the DISPATCH ALERT state 106, the state machine transitions to the DISPATCH TALK state 105, if the user answers a received dispatch alert. If the user does not respond to the dispatch alert, the state machine transitions from the DISPATCH ALERT state 106 back to the IDLE state 100. From the DISPATCH TALK state 105, after the user transmits to another user, the state machine transitions to the DISPATCH LISTEN state 104.

When in the DISPATCH LISTEN state 104, if the user transmits to another user, the state machine transitions to the DISPATCH TALK state 105. If the user does not transmit to another user when in the DISPATCH LISTEN state 104, the state machine transitions to the IDLE state 100 after a predetermined period of time. Specifically, if there is no communication between users for a "hang time" period of, for example, six seconds, the dispatch call is terminated and the state machine transitions to the IDLE state 100.

Figure 2:
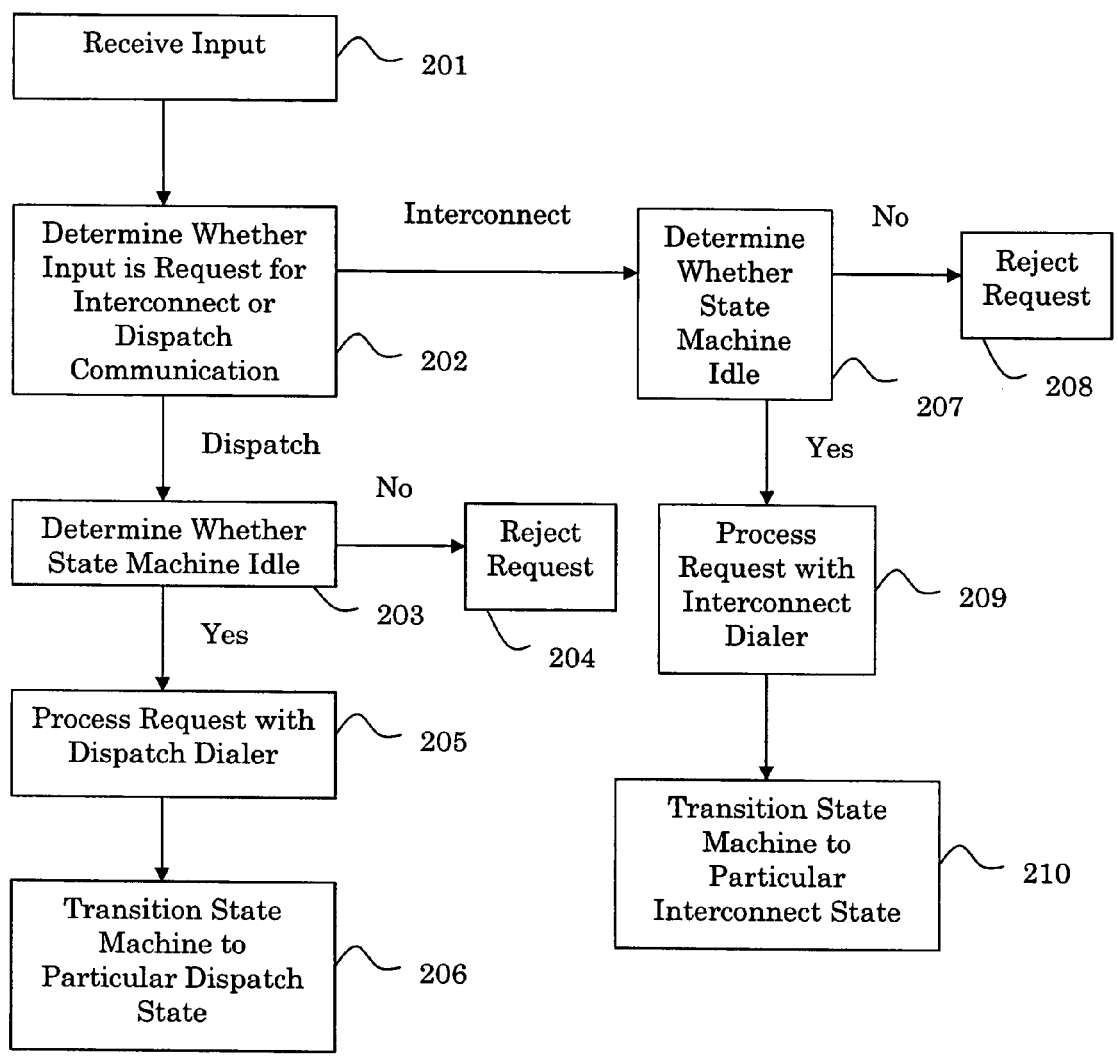
FIG. 2 illustrates an exemplary method for controlling operations of a dual dialer state machine in accordance with the present invention.

FIG. 2 illustrates a method for controlling operations of a dual dialer state machine in accordance with the present invention. The method for controlling operations of a dual dialer state machine in a Radio Interface Layer (RIL), includes the acts of: receiving a first input (step 201); determining whether the first input is a first request for a first type of communication or a second request for a second type of communication (step 202); determining whether the state machine is in an idle state (steps 203 and 207); rejecting the first request (step 204) and the second request (step 208), if the state machine is not in the idle state; processing the first request using a first dialer, if the state machine is in the idle state (step 205), and transitioning the state machine to a particular state of the first type of communication (step 206); and processing the second request using a second dialer, if the state machine is in the idle state (step 209), and transitioning the state machine to a particular state of the second type of communication (step 210).

In an exemplary embodiment of the present invention, the first type of communication is a dispatch communication and the second type of communication is an interconnect communication. The dispatch communication may be a dispatch alert, an incoming dispatch call or an outgoing dispatch call. The interconnect communication may be either an incoming interconnect call or an outgoing interconnect call. Depending upon whether the input is a request for an interconnect communication or a request for a dispatch communication, either the interconnect dialer or the dispatch dialer is used to process the input. In particular, a dispatch dialer is used to process dispatch communications, and an interconnect dialer is used to process interconnect communications. Thus, by having a dual dialer state machine, both interconnect calls and dispatch calls can be processed correctly.

Figure 3:
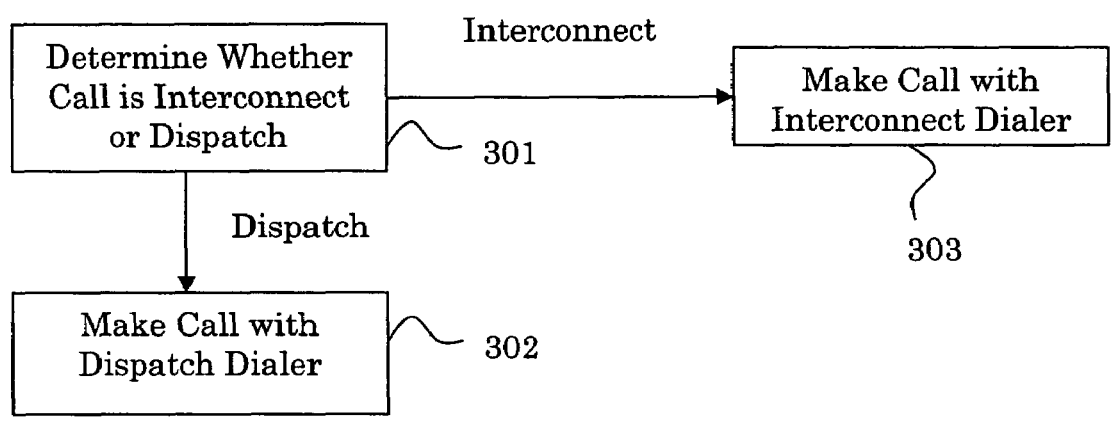
FIG. 3 illustrates another exemplary method for controlling operations of a dual dialer state machine in accordance with the present invention.

In another exemplary embodiment of the present invention illustrated in FIG. 3, a method for controlling the operations of a dual dialer state machine, includes the acts of: determining whether a call is an interconnect call or a dispatch call (step 301); using a first dialer to make the call, if the call is the dispatch call (step 302); and using a second dialer to make the call, if the call is the interconnect call (step 303). The first dialer may be a dispatch dialer, and the second dialer may be an interconnect dialer.

In an exemplary embodiment of the present invention, a computer-readable medium encoded with a computer program for controlling operations of a dual dialer state machine in a Radio Interface Layer (RIL) is provided. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

As illustrated in FIG. 2, the computer program includes instructions for: receiving a first input (step 201); determining whether the first input is a first request for a first type of communication or a second request for a second type of communication (step 202); determining whether the state machine is in an idle state (steps 203 and 207); rejecting the first request (step 204) and the second request (step 208), if the state machine is not in the idle state; processing the first request using a first dialer, if the state machine is in the idle state (step 205), and transitioning the state machine to a particular state of the first type of communication (step 206); and processing the second request using a second dialer, if the state machine is in the idle state (step 209), and transitioning the state machine to a particular state of the second type of communication (step 210).

In an exemplary embodiment of the present invention, the first type of communication is a dispatch communication and the second type of communication is an interconnect communication. After determining whether the input is a request for an interconnect communication or a request for a dispatch communication, either the interconnect dialer or the dispatch dialer is used to process the input. The interconnect communication may be either an incoming interconnect call or an outgoing interconnect call. The dispatch communication may be a dispatch alert, an incoming dispatch call or an outgoing dispatch call. The dispatch dialer is used to process dispatch communications, and the interconnect dialer is used to process interconnect communications.

In another exemplary embodiment of the present invention, a computer-readable medium encoded with a computer program for controlling operations of a dual dialer state machine in a Radio Interface Layer (RIL) is provided. The computer program includes instructions for: determining whether a call is an interconnect call or a dispatch call (step 301); using a first dialer to make the call, if the call is the dispatch call (step 302); and using a second dialer to make the call, if the call is the interconnect call (step 303), as illustrated in FIG. 3. The first dialer may be a dispatch dialer, and the second dialer may be an interconnect dialer.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling operations of a dual dialer state machine in a Radio Interface Layer (RIL), the method comprising the acts of:
   receiving a first input;
   determining whether the first input is a first request for a first type of communication or a second request for a second type of communication;
   determining whether the state machine is in an idle state;
   rejecting the first request and the second request, if the state machine is not in the idle state;
   processing the first request using a first dialer, if the state machine is in the idle state, and transitioning the state machine to a particular state of the first type of communication; and
   processing the second request using a second dialer, if the state machine is in the idle state, and transitioning the state machine to a particular state of the second type of communication.

2. The method of claim 1, wherein the first type of communication comprises a dispatch communication and the second type of communication comprises an interconnect communication.

3. The method of claim 2, wherein the interconnect communication comprises one of an incoming interconnect call and an outgoing interconnect call.

4. The method of claim 2, wherein the dispatch communication comprises one of a dispatch alert, an incoming dispatch call and an outgoing dispatch call.

5. The method of claim 1, wherein the particular state of the first type of communication comprises one of dispatch alert, dispatch talk and dispatch listen.

6. The method of claim 1, wherein the particular state of the second type of communication comprises one of interconnect dialing, interconnect in call and interconnect ring.

7. A method for controlling the operations of a dual dialer state machine in a Radio Interface Layer (RIL), the method comprising the acts of:
- determining whether a call is a dispatch call or an interconnect call;
- using a first dialer to make the call, if the call is the dispatch call; and
- using a second dialer to make the call, if the call is the interconnect call.

8. The method of claim 7, wherein the first dialer is a dispatch dialer.

9. The method of claim 8, wherein the second dialer is an interconnect dialer.

10. A computer-readable medium encoded with a computer program for controlling operations of a dual dialer state machine in a Radio Interface Layer (RIL), the computer program comprising instructions for:
- receiving a first input;
- determining whether the first input is a first request for a first type of communication or a second request for a second type of communication;
- determining whether the state machine is in an idle state;
- rejecting the first request and the second request, if the state machine is not in the idle state;
- processing the first request using a first dialer, if the state machine is in the idle state, and transitioning the state machine to a particular state of the first type of communication; and
- processing the second request using a second dialer, if the state machine is in the idle state, and transitioning the state machine to a particular state of the second type of communication.

11. The computer-readable medium of claim 10, wherein the first type of communication comprises a dispatch communication and the second type of communication comprises an interconnect communication.

12. The computer-readable medium of claim 11, wherein the interconnect communication comprises one of an incoming interconnect call and an outgoing interconnect call.

13. The computer-readable medium of claim 11, wherein the dispatch communication comprises one of a dispatch alert, an incoming dispatch call and an outgoing dispatch call.

14. The computer-readable medium of claim 10, wherein the particular state of the first type of communication comprises one of dispatch alert, dispatch talk and dispatch listen.

15. The computer-readable medium of claim 10, wherein the particular state of the second type of communication comprises one of interconnect dialing, interconnect in call and interconnect ring.

16. A computer-readable medium encoded with a computer program for controlling operations of a dual dialer state machine in a Radio Interface Layer (RIL), the computer program comprising instructions for:
- determining whether a call is a dispatch call or an interconnect call;
- using a first dialer to make the call, if the call is the dispatch call; and
- using a second dialer to make the call, if the call is the interconnect call.

17. The computer-readable medium of claim 16, wherein the first dialer is a dispatch dialer.

18. The computer-readable medium of claim 16, wherein the second dialer is an interconnect dialer.

* * * * *